Sept. 2, 1969     G. BADALINI     3,464,206
HYDRAULIC CHANGE SPEED GEAR
Filed June 14, 1967     5 Sheets-Sheet 4
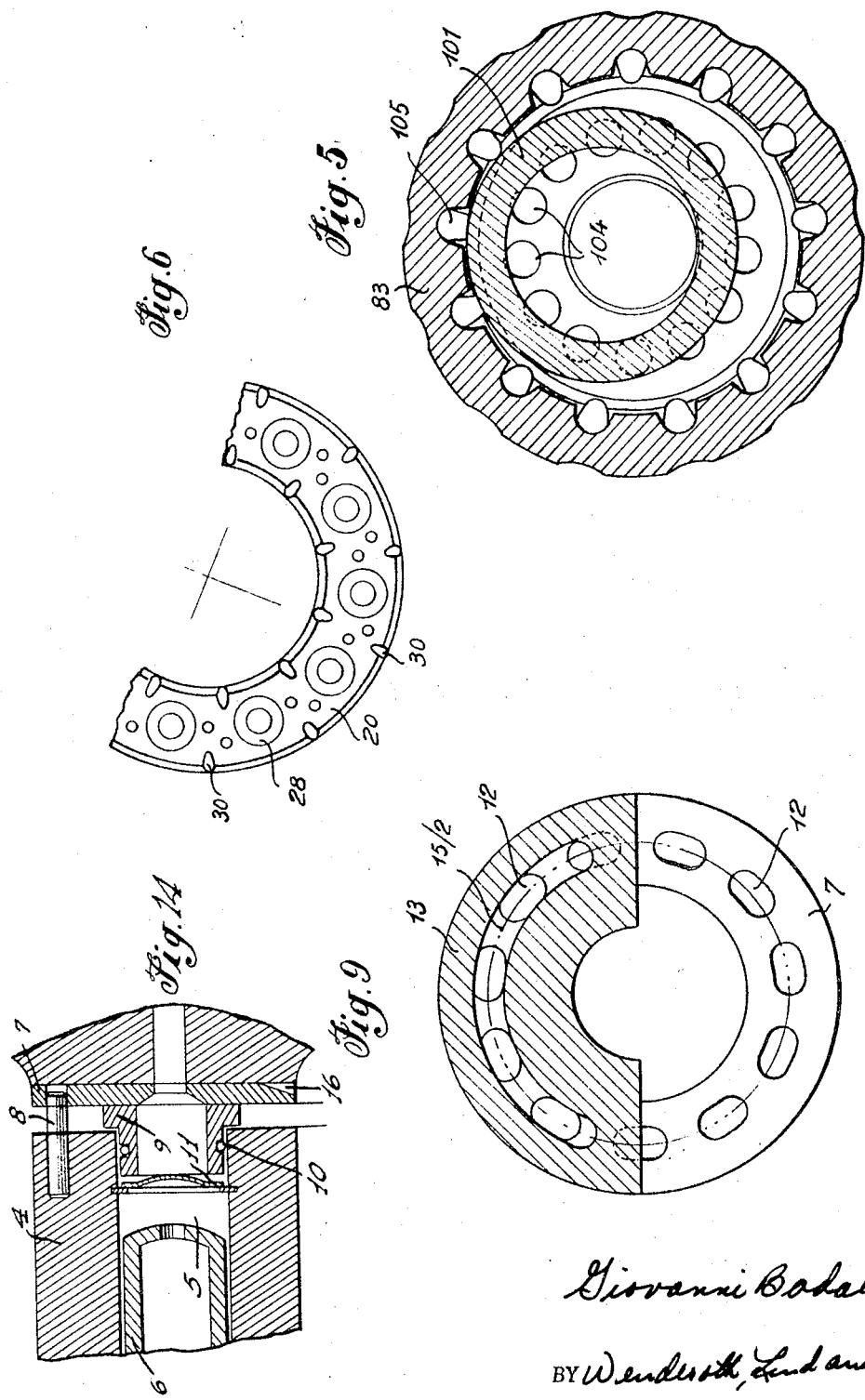
INVENTOR,
Giovanni Badalini
BY Wenderoth, Lind and Ponack,
ATTORNEYS Sept. 2, 1969  G. BADALINI  3,464,206
HYDRAULIC CHANGE SPEED GEAR
Filed June 14, 1967  5 Sheets-Sheet 5

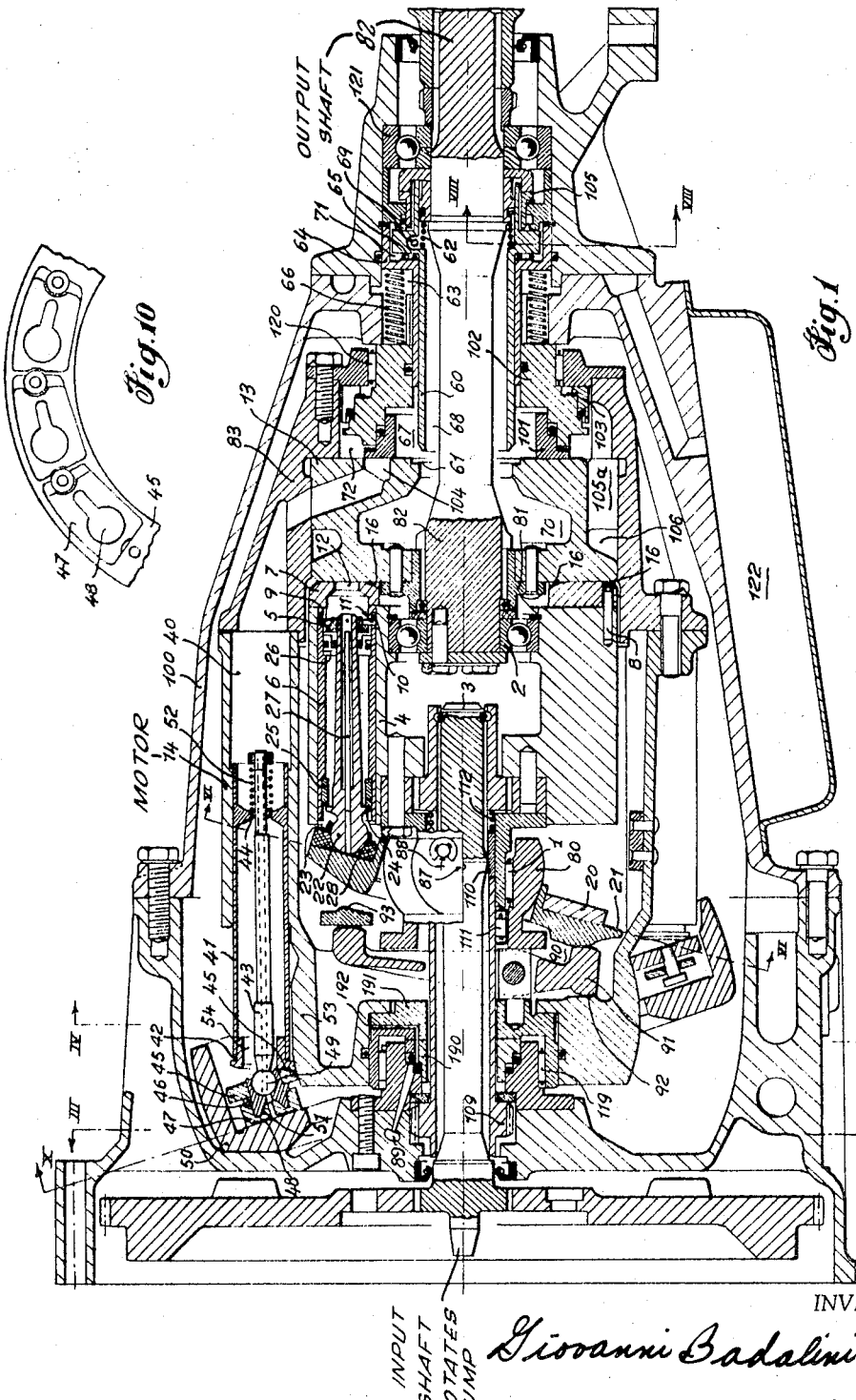

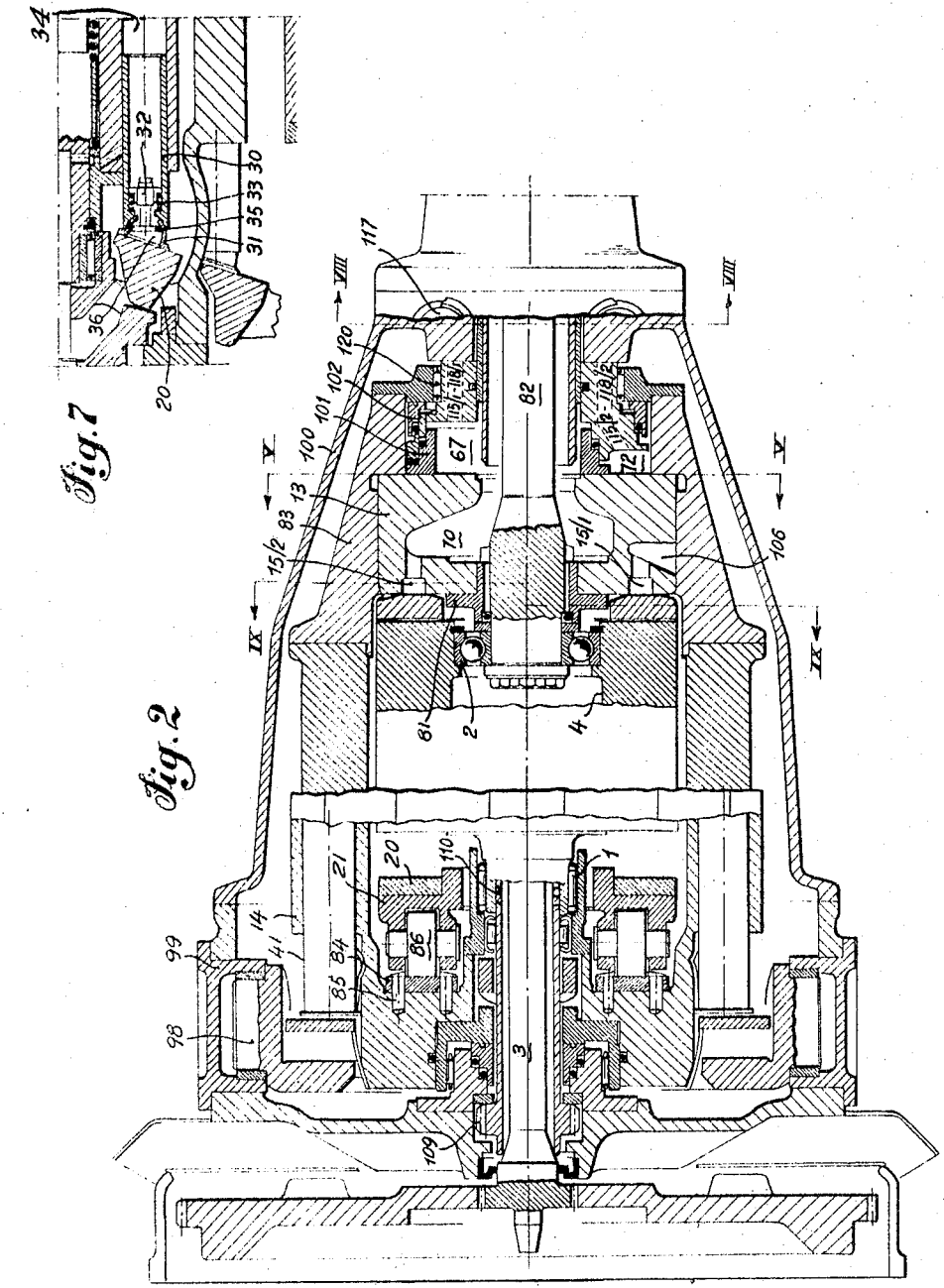

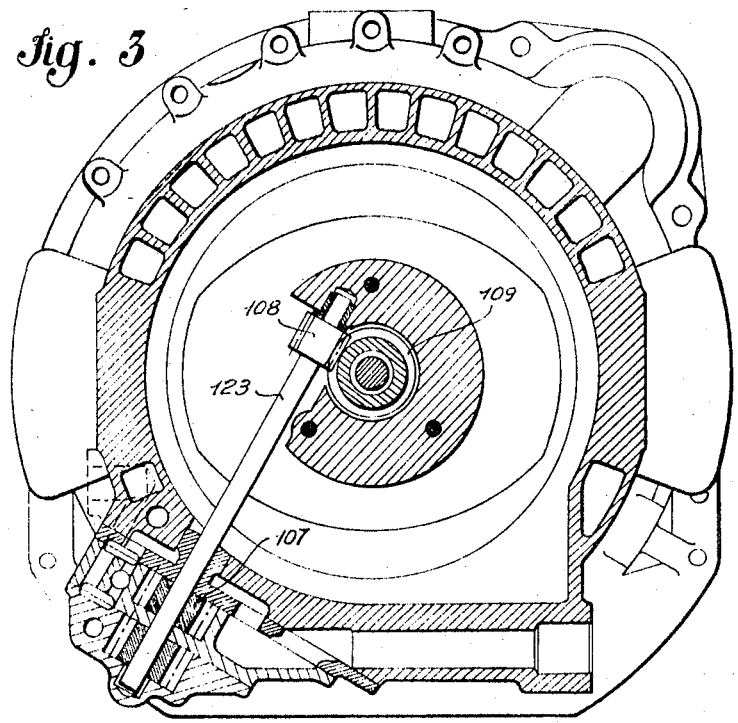
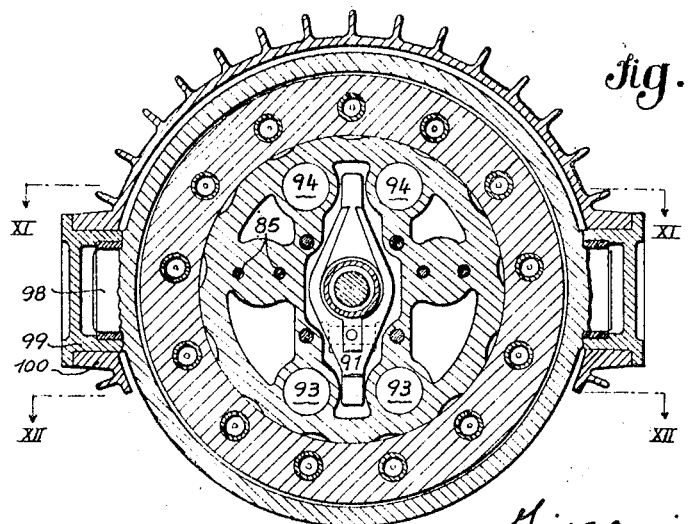

INVENTOR,
Giovanni Badalini
BY Wenderoth, Lind & Ponack
ATTORNEYS

United States Patent Office 3,464,206
Patented Sept. 2, 1969

3,464,206
HYDRAULIC CHANGE SPEED GEAR
Giovanni Badalini, Rome, Italy, assignor to S.p.A. Cambi Idraulici Badalini, Rome, Italy
Filed June 14, 1967, Ser. No. 646,091
Claims priority, application Italy, June 15, 1966, 13,765/66
Int. Cl. F16h *41/18;* F04b *1/02*
U.S. Cl. 60—53                                     12 Claims

ABSTRACT OF THE DISCLOSURE

A hydraulic change speed gear for motor vehicles of the type including a hydraulic pump rigid with the motor shaft, a hydraulic motor rigid with the drive shaft and an apertured front type distribution member interposed therebetween, in which against the surface of the apertured distributor the cylinder body does not directly rest, but a ring rests, interposed between said distribution surface and the cylinder body, the cylinder body being perfectly adjusted and said ring (anyway rotated by the cylinder body) pushed against the surface of the distributor, free of lying thereon under the action of hydraulic forces provided for the seal. The connection between the pump body or the hydraulic motor body with the associated swash plate, is obtained by means of a thrust bearing ring, interposed between the variable inclination swash plate and the ends of the connection rods carried either by the pump or by the pump or by the hydraulic motor. Said connection rods are provided with means to form a constant oil film on said thrust bearing ring, so as to cause the floating thereof.

---

The present invention relates to a hydraulic change speed gear for motor vehicles. More particularly, this invention relates to a hydraulic change speed gear of the type inclding a hydraulic pump operated by the motor shaft, and a hydraulic motor operated by said pump and connected to the drive shaft of the vehicle.

The purpose of this invention is that of embodying in a change speed gear of the related kind, certain functional and constructional improvements in the more stressed members, such as the distribution units of the pump and of the motor, and the connection of the latter with the associated variable inclination swash plates.

According to this invention it is provided a distribution system for hydraulic pump or motor of the apertured front type, including a ring interposed between the cylinder body and the distribution surface, rotated by said cylinder body and provided with means suitable to ensure the hydraulic seal between said elements.

Also, according to this invention, the connection between the pump body or the hydraulic motor body with the associated swash plate, is obtained by means of a thrust bearing ring, interposed between the variable inclination swash plate and the ends of the connection rods carried either by the pump or by the hydraulic motor. Said connection rods are provided with means to form a constant oil film on said thrust bearing ring, so as to cause the floating thereof.

This invention will now be described with reference to the attached drawings, showing by way nonlimitative example, one preferred embodiment of the invention itself:

In the drawings:

FIGURE 1 is an axial sectional view taken along a horizontal plane,

FIGURE 2 is an axial sectional view taken along a vertical plane,

FIGURE 3 is a sectional view taken along the plane III—III of FIGURE 1,

FIGURE 4 is a cross sectional view taken along the plane IV—IV of FIGURE 1,

Figure 11:
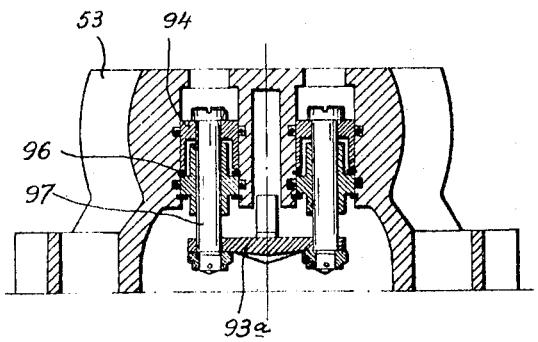
Figure 8:
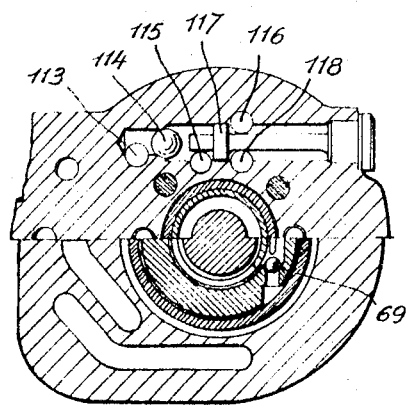
Figure 12:
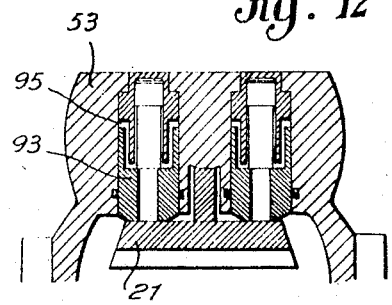
Figure 13:
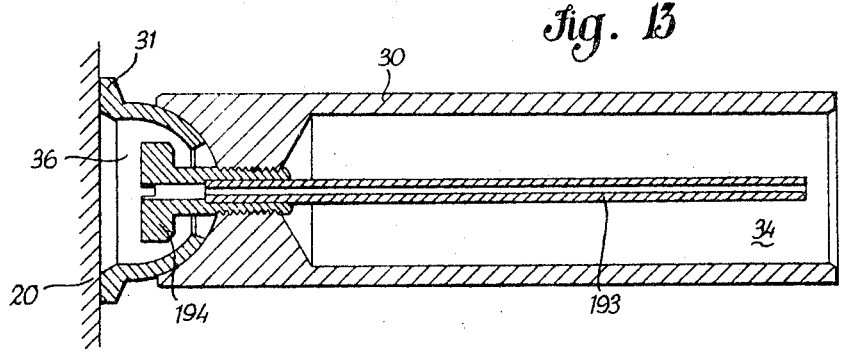

FIGURE 5 is a partial cross sectional view taken along the plane V—V of FIGURE 2, FIGURE 6 is a partial cross sectional view taken along the plane VI-VI of FIGURE 1, FIGURE 7 is a cross sectional view of a variant of the connecting device between the pistons of the hydraulic pump and the associated swash plate, FIGURE 8 is a mixed cross sectional view according to the planes VIII—VIII of FIGURES 1 and 2., FIGURE 9 is a cross sectional view according to the line IX-IX of FIGURE 2, FIGURE 10 is a partial view of the cross section according to the plane X of FIGURE 1, FIGURES 11 and 12 show the cross sectional views acording to the planes XI—XI and XII—XII respectively of FIGURE 4, FIGURE 13 shows a variant of the device of FIGURE 7, FIGURE 14 shows a detail of the distribution system of the hydraulic pump.

With reference to FIGURES 1 to 4, the motion input shaft 3 rotates the cylinder body of the pump, the latter being mounted on two rolling bearings 1 and 2. Said rolling bearings are supported respectively as follows: the bearing 1 on the collar 80 rigid with cylinder body of the motor 14 and the bearing 2 on the output shaft 82 from the change speed gear, which in turn, through the ring 81, the distributor 13 and the seal 83, is rendered rigid with said cylinder body 14 of the hydraulic motor.

The rotating casing formed by the cylinder body 14 of the motor, by its seal 83 and by the distributor 13, the whole being rigid with the output shaft 82, is free to rotate on the two rolling bearings 119 and 120 and axially adjusted by the ball bearing 121. These three bearings are mounted on the outer stationary casing of the change speed gear which is generally indicated by the numeral reference 100.

Said rotating casing contains the aforesaid pump, with its distribution members 7 and 13 and with the variable inclination swash plate 21, radially adjusted by the spherical surface of the support 80 and to rotation by two lateral flatenings of the support itself. The plate itself rests on the internal surface of the rotating casing on the little supports 84 (fixed thereto by the pins 85) with the rollers 86. Of course, the surface of the supports 84 whereon the rollers rest, have a cylindrical shape, in order to allow the plate to oscillate about the axis 88, displaced with respect to the plane passing through the axis of the change speed gear.

In the terminal part 53 of the cylinder body 14 the necessary members for changing the inclination of the plate 21 are located.

Since, as aforesaid, the oscillation axis of the plate 21 is out of the center with respect to the axis of the change speed gear, the plate under the centered thrust of the pistons, will always tend to take and to maintain a fully inclined position as shown in the drawing.

This is the normal operating position of the change speed gear.

Other patents of the same applicant disclose that the swash plate, besides the fully inclined position as already described, must be capable of taking three other positions:

Reduced speed (plate with a partial inclination in the same direction as shown in FIGURE 1);

Neutral (plate perpendicular to the axis of rotation);

Reverse motion (plate inclined through a certain angle in reverse direction with respect to the representation of FIGURE 1).

It must be possible to obtain these motion conditions by acting from outside of the rotary casing only on the duct 89 which by the seal ring 190 carries the oil, through the duct 191 and the annular chamber 192, to the chambers 95 and 96 of four jacks 93 and 94 (see also FIGURES 11 and 12) glidable within seats provided in the terminal part 53 of the cylinder body 14 of the hydraulic motor.

The two jacks 93 serve the purpose already described in other patents of the same applicant, of carrying the plate to its perpendicular position (neutral) and into the position of contrary inclination (reverse motion).

Obviously the position represented in FIGURE 1, concerned with the normal speed, is obtained with the duct 89 connected with the exhaust.

In the last cited condition the plate 21, due to the aforesaid displacement of the two rest rollers, will be kept adherent by the pressure of the pistons on the suitable abutment 90 of the level 91 which in turn rests at 92 on the rotary casing 53.

When the duct 89 is supplied with a low pressure (obtained by a pressure reducing valve fed by the operative pressure itself and therefore proportional to the last cited pressure) the pistons 94, through the stems 97 and the cross member 93a, will move the lever 91 so as to move the rest 90 of the inclinable plate to the desired position for the reduced speed.

Of course said low pressure must be so limited that, acting also onto the pistons 93, the latter are unable to further operate the plate towards its neutral position.

As aforesaid, the rotary casing includes the bores 40 for the pistons of the hydraulic motor. The ring 45 which connects the plurality of pistons 41 is directly adjusted on a spherical part 45a where the cylinder body 53 of the motor ends.

The tiltable plate 50 of the hydraulic motor, by means of the pin 98 and bushings 99, is supported on the stationary outer casing 100 of the change speed gear, and controlled for its variable inclination by a suitable automatic device 122.

The distribution of the oil of the hydraulic motor occurs by means of the distributor 13 having on the rear surface of said distributor the holes 104 (one for each cylinder) which are alternately caused to communicate with the suction port or delivery of the pump by the ring 101 (FIGURE 5) resting on the surface itself, kept in eccentrical position by the support 102 rigid with the stationary casing 100 of the speed change gear. The seal rings 103 and 105 complete the seal of the hydraulic circuit of the change speed gear.

The change speed gear circuit, starting from the pump delivery will be: recess 15/2, chamber 70, chamber 67, holes 104 at the suction side of the motor, holes 104 at the delivery side of the motor, the chamber 72, channels 105a, chamber 106 and recess 15/1 for the pump suction.

It is known that in the change speed gears of this type a system of two check valves 114/1 and 114/2 (FIGURE 8) is necessary, allowing the oil of a little supplementary pump at low pressure to enter always into that circuit of the change speed gear which is not pressurized in order to replace the losses of the other circuit.

The oil of this supplementary pump, through the ducts 113/1 and 113/2 enters through the holes 115/1 and 115/2 respectively, into the chambers 67 and 72 of the change speed gear.

The ducts 118/1 and 118/2 (also communicating with the chambers 67 and 72) will allow through the holes 116/1 and 116/2 the short-circuiting of the oil in the two chambers 67 and 72 so as to obtain for particular cases a complete disconnection of the transmission. The pump of FIGURE 3 is the pump which provides for the above function and its delivery will therefore be connected to the holes 113/1 and 113/2.

Said pump is controlled by the shaft 123 which towards the toothed wheels 108 and 109 is operated by the input shaft 3 of the change speed gear. For this purpose, the toothed wheel 109 is provided with a tubular extension ending with a saw tooth clutch so that the member 110 rotated by the shaft 3 and pushed against the pinion 112 by the spring 112, by means of the saw teeth of which it is provided, will turn to rotate it.

However, when, the engine being stationary, the car is pushed, the rotation of the gear 109 will be transmitted by the roller free wheel 111, the outside of which is rigid with the member 80, rigid in turn with the output shaft from the change speed gear. Under these conditions, with the engine stationary, too (and therefore with the shaft 3 stationary) the pump will be capable of rotating as the saw teeth between the members 109 and 110 will not engage, leaving the gear 109 free to rotation.

The free wheel device is of course utilized for filling the change speed gear when the car is started by pushing it, and consequently with the engine stationary.

The cylinder body of the pump is, as aforesaid, radially and axially adjusted by means of the bearings 1 and 2 and is rotated by the motion input shaft 3.

A set of bores 5 as shown in FIG. 14 is provided for in the cylinder body 4 and in said bores glide the respective pistons 6.

In front of the cylinder body 4 there is the ring 7, rotated by the body itself by means of the pins 8, leaving free the axial adjustment of the ring.

Against one surface of the ring 7 rest a plurality of little rings 9 (one for each piston) preventing the oil from escaping from the cylinder bore to the corresponding hole of the ring 7, and the seal of which is ensured by the ring packing 10 as far as the radial seal between the cylinder body and the little ring is concerned, and by the spring 11 as to the front seal between the little ring and the ring 7.

The springs 11 rest on a suitable abutment of the bore 5 and the little rings are of course free to assist the possible axial movements of the ring 7.

The ring 7 is provided with a plurality of bores corresponding to the bores 5 of the cylinder body, shaped as shown in the drawing, resting on the surface of the distributor 13, bodily mounted with the rotary casing of the change speed gear, which in turn carries the tiltable plate 21 whereon the pump pistons rest.

On the surface of the distributor (FIGURE 9) are provided the ports 15/1 and 15/2 respectively, for the suction and delivery of the pump.

On the surface of the disc 7 contacting the distributor (with respect to which the rotation occurs) are provided the exhausts 16 so dimensioned that the thrust differential toward one direction of the little rings 9 and the counter-thrust in the contrary direction of the recesses 15 and of the oil entering between said two surfaces, will originate a thrust resultant to the ring 7 against the distributor, such as to ensure the seal, however with no excessive thrust capable of causing any wear between the two surfaces quickly rotating with respect of one to another.

The above described system allows the cylinder body to be perfectly adjusted, giving to the sole ring 7 the function of resting on the distributor surface. (Of course if this function would be served by the cylinder body directly, it would be subjected to the stresses due to the torque transmission, to the piston friction, etc.).

The exhausts 16, besides delimiting the wedging surfaces of the oil, also serve for the lubrication of the inner and outer surfaces of the ring.

The rings, furthermore, ensure the adherence of the distribution surfaces when, with the engine stationary, there is no pressure in the circuits, so as to have already contact at the start of the unit.

Of course, instead of a spring for each single little ring, it is possible to mount a disc, connecting all the little rings among each other, pushed in turn by a spring set or also by an elastic disc, serving along the same purpose.

The connection between the pistons of the pump and the swash plate 21 is embodied by means of the aluminum silicon alloy ring 20, which rests on the surface (having a molybdenum insert) of the swash plate 21. Said ring carries the recesses for the spherical heads of a plurality of connecting rods 22 kept in their seats by the rings 23. Said connecting rods have a collar 24 resting on an end ring 25, forced inside the piston 6.

At its end opposite to the ball, the connecting rod is adjusted on the ring 26, rigid with the piston, with an arrangement allowing the possibility of a limited axial clearance, allowing, however, the seal between the piston and the connecting rod. The connecting rod 22 is axially bored and in said bore is inserted a capillary little pipe serving the purpose of carrying the pressurized liquid into the recesses 28 provided on the surface of the ring 20, contacting, and relatively rotating with respect to, the surface of the swash plate 21.

The pressure prevailing in the chamber 29 during the operation of the device, will cause the oil to pass through the little pipe 27, and as the surface of the ring contacting the plate is suitably shaped, the pressure, totally acting on the surface of the sumps 28 and with the deriving law of wedging between the two contacting surfaces, gives a thrust greater than that of the plurality of the pistons so that the ring itself will tend to rise and to rotate then on an oil layer. However, as soon as a certain rising occurs, the oil escape from the sumps 28 will increase, and therefore increases the amount and consequently also the speed of the oil through the capillary tubes 27. There is therefore a greater loss of charge which causes a pressure diminution of the oil in the sump 28 and consequently a limitation of the floating level and of oil consumption.

By suitably choosing the diameter of the capillary bore of the tube 27 (or its length) and suitably dimensioning the design of the surface of the ring 20 (the exhausts 30 of FIGURE 6 are useful for limiting the wedging of the oil and ensuring the lubrication at each point), the right floatation will be obtained so as to reach the minimum friction with the minimum oil consumption (maximum efficiency of the pump or of the motor).

The ring 20 has also the characteristic of binding, through the connection rods (the pistons and therefore, as one half of the pistons will always be under pressure, of returning the sucking pistons of the pump.

The connecting rods also serve the function of moving the oil from the chamber 29 to the chamber 28.

The main function of the connecting rods, however, is of course that of transmitting the torque necessary to the rotation of the cylinder body of the pump or deriving from the cylinder body, if the device is utilized as motor.

In FIGURE 1, wherein the maximum angle of inclination of the swash plate 21 is about 16°, said angle corresponds to about the angle of friction, the torque is only partially transmitted by the single connecting rod which bears against the inner surface of the ring 25, but practically by almost all the connecting rods of the pistons under pressure, by friction in the abutment 24 against the terminal surface of rest of the ring 25. The movements of the connecting rod small ends deriving from the inclination of the swash plate and therefore from the difference between a circle and an ellipse, will result in a rolling movement of the front surface of the collar 25 on the terminal surface of the bushing 25, while the transmission of the torque is effected most by the sliding fraction which hinders the gliding of the surfaces in normal direction to said rolling. Therefrom derives a torque transmission which is more uniform than that which would be obtained by relying only upon the contact of the connecting rods on the inner cylindrical surface of the bushing 24.

FIGURE 7 shows a constructive change which can be adopted when the rotational speeds are unable to render the return of the pistons, whereby said return can be obtained by a low pressure in the sucking ducts of the pump.

In this case, the pistons 30 are each provided with a runner 31 arranged in the convex end of the piston so that the runner will be able to oscillate through the angle corresponding to the maximum inclination of the swash plate 20.

A valve 32, returned by the spring 33 prevents the runner from becoming dismounted. The spring 33 is so gauged that the valve 32 will make a seal on the circle 35 until the pressure in the chamber 34 will overcome the pressure necessary for the return of the piston in the anticipated most severe condition of operation.

The highest pressure will open the valve, so that in the chamber 36, formed by the runner and by the surface of the plate, whereon the runner rests, will be formed the full pressure of the chamber 34, less the drop pressure caused by the valve.

The dimensioning of the diameter of the chamber 36 in its contact section with the rest plane, is so calculated that it balances most of the thrust of the piston and consequently that it has between the moving surfaces the right specific pressure which is necessary for the seal, but not excessive pressure, in order to avoid any wear between the contacting surfaces.

The suitable materials for embodying said device are the phosphorous bronze for the runner 31 and sprayed molybdenum on the plate 20.

With reference to FIGURE 13, the valve 32 can be replaced by the tube 193 carried by the screw 194, the head of which prevents the runner from becoming dismounted when the device is not under pressure.

By this system, the pressurized oil in order to reach the chamber 36 must pass through the bore of the long pipe 193. The contact surface between the runner 31 and the plate 20, wherein the pressure may act, is greater than the surface of the cross sectional area of the piston.

From the above it evidently appears that when the speed of the liquid inside the pipe is zero, in the chamber 36 will prevail the full pressure, and the runner will move apart. When the runner will move apart, of course a liquid speed will be obtained within the tube 193 causing a drop of the pressure within the chamber 36, and thereby the amount of the movement apart will be controlled.

By acting, of course, on the dimensions of both the pipe and the contact surfaces between the runner and the plate, it will be possible to maintain the movement apart and the oil consumption within the values suitable to the purpose to be obtained.

The connection between the body of the hydraulic motor 14 and the plate 50 consists of a plurality of pistons 41, resting by means of spherical segment rings 42 on a ring 45 (FIGURES 1 and 10).

A bored tappet 43 prevents the pistons and the rings from going out of phase, as at one ball shaped side 49 it engages the support 46 fixed to the ring, and at the other side it is sealingly engaged at 44 with a sealed system at the end of the piston.

Of course, there will always be a tappet at 54 which will effect the transmission of the friction torque of the ring 45.

Each support 46 (to which the oil arrives through the tappet 43 of the chamber 40) carries in turn a runner 47 of a suitable material which glides on the surface of the variable inclination swash plate 50. The suspension of the runner 47 on the support 45 is so embodied that a cylindrical surface prevents the runner from escaping due to centrifugal force, and a conical spherical rest 51 allows the runner to effect slight oscillations, and at the same time to carry the oil from the support to the chamber 48 of the runner itself.

The surface of the runner contacting the plate 50, wherein, as aforesaid, the recess 48 is provided, is so designed and dimensioned that for low rotational speed the pressure which there prevails will discharge almost completely the thrust of the piston 41 on each runner.

The disc 45 has a thickness rather reduced so that by flexing all runners are capable of following the unavoidable deformations of the plate. The pivot of the runner 47 on the support 46 is not at the center of the runner surface, but displaced towards such a direction that a greater surface will be in advance with respect to the preferential direction of motion.

By this displacement, when the rotational speed increases, and consequently also increases the speed of the runners on the plate 50, the runner, the support of which, as aforesaid, allows little oscillations, tends to become inclined towards the direction of rising from the part of the greater surface so that due to a dynamic effect it will float on the oil.

Increasing the rotational speed, however, also causes the tendency to rising of the runner to increase and therefore also the oil request from the chamber 40 will increase. As said oil has to pass through the little bore of the tappet 43, the increase of speed corresponding to a greater demand, will cause a pressure drop in the chamber 48 and therefore a load increase on the runner, with a consequent annulment of the increase of dynamic effect due to the increase of speed.

Acting, therefore, on the amount of the surface of the recess 48, on the amount of the front surface of the runner, on the distance of the pivot of the runner from the center of the figure of its surface and on the diameter or the length of the tappet bore, the best compromise will be obtained between the runner friction and the pressurized consumed oil, so as to obtain the best efficiency of the device.

A spring 52 always keeps the piston adherent to the ring, also when, in case the device has to operate as a pump (for instance as engine-brake) the sucking piston will tend to move apart from the ring itself.

When the plate 50 of the hydraulic motor is perpendicular to the shaft of rotation, as aforesaid, the torque transmission occurs integrally through the pump which, as the displacement of the hydraulic motor is null, will operate as a hydrostatic coupling, transmitting integrally the revolutions and the torque.

Under this condition, the hydraulic motor will operate exclusively as a closing valve of the oil ducts coming from the pump distributor. In the hydraulic motor, under these conditions, no mechanical loss will occur due to the alternating movement (zero speed of the pistons) and no hydraulic loss due to a pressure drop in the ducts (zero speed of the liquid). There will however be:

(a) Mechanical losses due to the high rotational speed with loads of the different parts of the motor;

(b) Volumetrical losses due to the pressure in the chambers of the motor itself.

In order to avoid said losses (of course only when the motor swash plate is perpendicular to the axis of rotation) in the change speed gear, there is a sleeve valve 60 and 61, which, advancing against the distributor 13, closes the communication between the chamber 70 and the chamber 67, i.e., prevents the pressurized oil of the pump which is transmitting the torque in the top gear, from acting on the motor pistons.

Said valve 60 is continuously subject to close under the action of the spring 62 and will therefore be shut when the chamber 63, formed by the two diameter piston 64 and by the outer casing of the change speed gear, is connected to exhaust.

In fact, said piston, when the chamber 63 is connected to the exhaust, will be full forward (leaving therefore free the valve 60 to move for its closure), as within the chamber 71 there will always prevail the filling pressure of the circuit, and which will reach the chamber 71 through the clearance between the piston 64 and the valve 60.

When pressure from outside is sent to 63, the piston 64 will be between two equal chambers under the same pressure and therefore under the action of the springs 66, acting on the thrust bearing 65, will open the valve 60.

In the chamber 63, for the valve opening operation, oil will be sent by two ball check valves which select the highest of the pressures, between that obtained with tractive engine and that obtained with braking motor, so that if the valve itself tends to remain jammed, in its seat while the swash plate of the motor starts inclinating, the hydraulic motor would create an overpressure in the chamber 72 higher than that of the chamber 67, which would cause the opening of the valve, helping thus the spring 66.

A valve 69 is provided between the chamber 71 and the chamber 68 so that with the accelerator free and, with the valve blocked, the filling oil could exert its function in the chamber 60, which in this case would be with no pressure and would tend to empty due to the unavoidable blow-by in the opposite pressurized chambers.

The present invention has been described in one preferred embodiment; it is however understood that constructional changes could be practically adopted without departing from the scope of the present industrial invention.

Having thus disclosed the invention, what is claimed is:

1. A hydraulic change speed gear for motor vehicles comprising in combination a motor shaft (3), a hydraulic pump rigid with said motor shaft and having a cylinder body (4), pistons (6) and connecting rods (22) operating within bores in said cylinder body, a drive shaft (82), a hydraulic motor rigid with said drive shaft, swash plates for hydraulic pump and motor, an apertured front type distribution member (13) interposed between said hydraulic pump and motor, a distribution ring (7) interposed between the apertured distribution member (13) and said cylinder body (4), said ring being rotated by said cylinder body by means of pins (8) and movable against the surface of the distribution member.

2. A hydraulic change speed gear as claimed in claim 1, wherein a set of small sealing rings (9) is provided between said bores (5) of said cylinder body (4) and said distribution ring (7) for ensuring the seal therebetween, said small rings being pushed against the distribution ring (7) by a set of springs (11) and by the pressure prevailing in the hydraulic circuit, exhaust holes (16) being provided on the working surface of said distribution ring to ensure a hydraulic balance of the thrust of the distribution ring against the distribution member (13) and lubrification of the contact surface thereof.

3. A hydraulic change speed gear as claimed in claim 1, wherein the pistons and the connecting rods of the hydraulic pump and motor are shaped so as to transmit the torque by friction between the surfaces of the connecting rod and of the piston, both lying in the plane of the torque to be transmitted, while the necessary bedding for the radial difference of path of the ring, occurs by rolling of the surface of the connecting rod on the corresponding surface of the piston.

4. A hydraulic change speed gear as claimed in claim 1, wherein a thrust ring (20) is provided between the connecting rod heads and the swash plate (21), said thrust ring having sumps (28) fed with oil through axial capillary pipe (27) in the connecting rod.

5. A hydraulic change speed gear as claimed in claim 1, wherein articulated circular runners (31) are provided between the piston and the tiltable swash plate, said circular runners (31) being carried by the pistons and each provided with a valve gauged at the pressure necessary to obtain a return stroke of the piston.

6. A hydraulic change speed gear as claimed in claim 5, wherein a low pressure pump is provided for supplying oil to obtain the piston return stroke.

7. A hydraulic change speed gear as claimed in claim 5, wherein said valve is gauged to open when the piston associated thereto is in pressure phase.

8. A hydraulic change speed gear as claimed in claim 5, wherein each piston is provided with an axial capillary internal tube, communicating with the chamber of the articulated runner to balance the thrust.

9. A hydraulic change speed gear as claimed in claim 1, wherein a thin thrust ring (45) is abutting the pistons, a set of tappets (47) being provided between said thin thrust ring (45) and said swash plate, a feeding rod (43) being provided having a spherical head and an axial capillary bore to supply the oil to tappet sump (48) to statically unload the piston thrust.

10. A hydraulic change speed gear as claimed in claim 9, wherein said tappets have a trapezoidal shape with pivot points displaced with respect to the center of the rest surface.

11. A hydraulic change speed gear as claimed in claim 9, wherein a return spring (52) prevents the piston from becoming spaced apart from the thrust ring.

12. A hydraulic change speed gear as claimed in claim 1, wherein a locking valve (60) is provided around the drive shaft (82) and is operated when the displacement of the hydraulic motor is annulled.

References Cited

UNITED STATES PATENTS

| | | |
|---|---|---|
| 2,452,704 | 11/1943 | Wahlmark. |
| 2,777,286 | 1/1957 | Badalini. |
| 3,196,616 | 7/1965 | Date et al. |
| 3,304,715 | 2/1967 | Page et al. |
| 3,364,679 | 1/1968 | Osojnak. |

EDGAR W. GEOGHEGAN, Primary Examiner

U.S. Cl. X.R.

103—162